United States Patent [19]

Vuilleumier et al.

[11] Patent Number: 5,513,031
[45] Date of Patent: Apr. 30, 1996

[54] ADJUSTABLE OPTICAL COMPONENT

[75] Inventors: Raymond Vuilleumier, Fontainemelon, Switzerland; Karsten Kraiczek, Waldbronn; Axel Wiese, Karlsruhe, both of Germany

[73] Assignee: Hewlett-Packard Company, Palo Alto, Calif.

[21] Appl. No.: 245,243

[22] Filed: May 17, 1994

[30] Foreign Application Priority Data

Jun. 9, 1993 [EP] European Pat. Off. .............. 93109248

[51] Int. Cl.⁶ .................................................. G02B 26/02
[52] U.S. Cl. .......................... 359/227; 359/230; 359/232; 359/233
[58] Field of Search .................................... 359/227, 230, 359/232–233, 196–199, 213, 214, 223, 224

[56] References Cited

U.S. PATENT DOCUMENTS

| 2,994,950 | 8/1961 | Siegler, Jr. et al. ...................... 29/434 |
| 4,017,162 | 4/1977 | Mills ...................................... 359/232 |

FOREIGN PATENT DOCUMENTS

| 2244163 | 5/1975 | France . |
| 0565069 | 10/1993 | Germany . |

Primary Examiner—James Phan

[57] ABSTRACT

An adjustable optical component, for example an optical slit having adjustable slit width, comprises a movable member for providing an optical function, for example a slit and/or a shutter, and resilient suspension elements for connecting the movable member to a frame. The essential parts of the movable member, of the resilient suspension elements and of the frame consist of microstructures which are made of a common base material. Preferably, these parts are manufactured from a silicon chip by a micromechanical technique comprising, for example, anisotropic etching. In the case of an optical slit, the movable member comprises a plurality of openings of different widths which constitute a step slit. In order to adjust different slit widths, the member is moved along a line parallel to the center line of the step slit, with the force for moving the member being applied at an opening. When the member is moved by an external force, the resilient silicon beams are bending and the bars are moving. The movable member has an integrated shutter position. A high reproducibility of the adjustment of the center positions of the openings constituting the step slit during repeated movement of the member is ensured.

13 Claims, 8 Drawing Sheets

ADJUSTABLE OPTICAL COMPONENT

The invention relates to an adjustable optical component, for example an optical slit having adjustable slit width. Such a slit is typically used in a spectrophotometer for adjusting the width of the entrance slit and/or of the exit slit.

BACKGROUND OF THE INVENTION

Most spectrophotometers allow to vary the widths of the entrance slit and of the exit slit. The slit width is increased when the amount of light entering the spectrophotometer is to be increased, for example in order to improve the signal-to-noise ratio. The increase of the slit width, however, has the consequence that the spectral resolution of the spectrophotometer is deteriorated. On the other hand, the resolution of a spectrophotometer can be improved, at the expense of the signal-to-noise ratio, by reducing the slit width.

There are various prior art solutions for achieving variability of the slit width. The simplest approach is to provide a replaceable slit which an operator can replace manually by a slit of a different width. This approach is of course cumbersome and inflexible so that slits with adjustable widths have been developed. A disadvantage of the existing adjustable slits, however, is that they are complex and costly. An adjustable slit is known, for example, from U.S. Pat. No. 3,394,977. According to this prior art, the entrance slit and the exit slit each have a fixed and a movable slit edge, wherein the movable edge is moved by means of a resiliently flexible arm. The slit adjustment mechanism is designed such that the widths of the entrance slit and of the exit slit are varied simultaneously. The known mechanism comprises a very large number of individual parts and is thus very complex, resulting in an increased susceptibility to trouble and high cost. Another disadvantage is that the center of the slit varies when the slit width is varied because one of the slit edges remains fixed. Furthermore, the adjustment of the slit width has to be performed manually by an operator.

Another adjustable slit system is known from U.S. Pat. No. 3,508,813. This slit system comprises a metalized quartz disc in which a plurality of slits of various widths are concentrically arranged. Two opposite slits have the same width, respectively and thus form a slit pair which serves as entrance slit and exit slit of a monochromator. Different slit widths can be selected in discrete steps by rotating the disc by a defined angle, respectively. The center of the slit is substantially preserved. However, the reproducibility in the adjustment of the slit centers may not be sufficient for very great demands on the spectroscopic accuracy.

From U.S. Pat. No. 3,457,004, an adjustable slit for a spectroscopic apparatus is known wherein a lever mechanism is provided for opening the two edges of the slit symmetrically from the center of the slit. This construction is mechanically complex, leading to high cost and increased probability of failure.

SUMMARY OF THE INVENTION

It is thus an object of the invention to provide an adjustable optical component, in particular an optical slit having adjustable slit width which has a simpler construction than the known components and which ensures high reproducibility in the adjustment of the center position of the component, in particular of the slit center.

Another object of the invention is to provide an adjustable optical component which is easy to manufacture with high precision but low cost.

It is a further object of the invention to provide an adjustable optical component wherein several optical functions, for example slit function and shutter function can easily be combined.

It is another object to create an optical slit which ensures high reproducibility in the adjustment of the slit width.

The adjustable optical component of the invention comprises a moveable member for providing an optical function, for example an optical slit, and resilient suspension means for connecting the movable member to a frame, wherein the movable member and the resilient suspension means mainly consist of microstructures made of a common base material, for example a semiconductor material such as silicon.

In a preferred embodiment of the invention, the microstructures are manufactured by microstructural techniques, for example by photolithographic techniques which are known as such for producing micromechanical components. Preferably, an optical component of the invention is produced from a semiconductor chip by removing semiconductor material using etching steps whereby the pattern of the desired microstructures has been applied photographically. It is understood, however, that other methods for removing material from the common base material could also be used to produce the desired microstructures.

In accordance with an underlying principle of the invention, the essential parts of the optical component, i.e., the movable member for providing an optical function, and the resilient suspension means can be manufactured from a single piece of material, for example a semiconductor chip, by using microstructural techniques. This has the advantage that a miniaturized component can be produced with very high mechanical precision and that the cost for producing the component is low. The components can be produced simultaneously in large numbers because a plurality of chips can be arranged on a semiconductor wafer and processed together at a time.

The reproducibility in the adjustment of a component of the invention is very high. It is better than +/−10 nanometers. This is particularly important in case of an optical slit wherein the center of the slit has to be maintained very precisely when the slit width is changed, especially in photodiode array spectrophotometers. Furthermore, the dimensions of the slit can be manufactured with very high precision. The mentioned features ensure high measuring accuracy when the component is used in a spectrophotometer.

It is another aspect of the invention that it permits to combine several optical functions in one component. Specifically, the invention permits to combine a slit having adjustable width and a shutter in a single component. Various slit widths or the shutter position are simply adjusted by a movement of the component. This is of particular advantage in a spectrophotometer wherein a shutter function is used to measure the dark current for performing a signal correction. In addition, a wavelength normal for calibration of the spectrophotometer, such as a holmium filter, an absorber, a second order filter, or a mirror can be provided in the component of the invention. The different optical functions are selected by moving the movable member such that the slit or shutter or filter, etc., is arranged in the optical axis of the spectrophotometer. In the prior art, the mentioned functions are performed by different components which are arranged at different positions in the spectrophotometer. In contrast thereto, the present invention is a much simpler and more compact design which can be produced at low cost, but still ensures high mechanical and optical precision.

A preferred embodiment of the invention is a slit having adjustable width and integrated shutter. For this purpose, the movable member which is suspended to the resilient suspension means comprises a plurality of openings of different widths and an opaque portion corresponding to the shutter position. The openings may be connected, thus forming a step slit or they may be separated by opaque portions. The resilient suspension means preferably comprise at least a pair of flexible beams which are connected to a stationary frame and which are manufactured from the same material, typically a semiconductor material, in a common manufacturing process. The adjustable slit of the invention provides a very good reproducibility of the center position of each of the different slit openings. In addition, this reproducibility is maintained over a large temperature range.

Also, the widths of the different openings can be manufactured with high accuracy and the edges of the openings are sharp and well-defined, thus ensuring that the light beam passing through the slit is precisely defined in its shape and dimensions.

In a further development of the invention, the frame to which the resilient suspension means are connected is fastened to a support at points which lie on the same line as the centers of the openings constituting the adjustable slit. This measure further contributes to the temperature stability of the center positions of the slit openings. In order to limit the height of the slit openings, an aperture plate may be provided which can also be manufactured by a microstructural technique from the same material as the remaining parts of the slit.

The resilient suspension means are preferably designed such that the movable member carrying the slit openings move along a straight line. This can be achieved in that the resilient beams which are connected with their one end to the movable member are not directly connected to the frame with their other end, but to additional movable bars which in turn are connected to the frame. These movable bars are manufactured in the same process together with the remaining portions of the slit by a microstructural technique. In a further development, additional intermediate movable bars and resilient beams can be provided, leading to a nested structure of movable bars and resilient beams. This design has the advantage that the path which the individual elements have to travel in the adjustment of different slit widths is reduced as compared to a less complex design so that the bending of the resilient beams is reduced and thus the risk of material fracture. Since the risks of fracture of the resilient beams is highest at the ends of these beams, another simple but effective measure is to design the resilient beams such that their cross section increases towards the ends of the beams so that excessive bending at the ends is avoided.

A further advantage of a slit according to the invention is that it can easily be produced with integrated mechanical stops which limit the movement of the movable member. These mechanical stops provide a precise reference point for the movement of the plate carrying the slit and therefore contribute to the accuracy in the adjustment of a desired slit width.

In summary, a slit according to the invention can be manufactured in a simple manner by one manufacturing process, wherein a plurality of elements, such as slit openings, slit edges, V-grooves in the slit area which are adapted to the conical shape of the light beam, resilient suspension beams, connecting bridges, stiffening ribs, bores for mounting and positioning and mechanical stops are produced in one process with high precision.

A slit according to the invention can also be used in an advantageous manner in a photodiode array spectrometer, i.e., a spectrometer wherein the light which has passed through a sample cell and which has been spatially separated by a diffraction grating impinges on an array of photodiodes. Conventional photodiode array spectrometers have an entrance slit of fixed width. The reason is that on one hand the entrance slit in a photodiode array spectrometer has to be adjusted very precisely because there is no possibility to re-calibrate the spectrometer with sufficient accuracy required for good wavelength accuracy, and on the other hand there have been no variable slits available which ensure that the precise adjustment is maintained when the slit width is changed. The present invention, however, provides such a variable slit which maintains the required optical alignment (i.e., reproducibility of the slit centers) even if the slit width is changed. Thus, it is possible that even a photodiode array spectrometer with high wavelength accuracy is furnished with an adjustable entrance slit.

A further advantage of the invention is that the adjustment of the slit width can be automated and controlled by a microprocessor, either in accordance with a pre-programmed schedule or in response to instantaneous measuring values, such as the light intensity in a spectrometer. For example, the slit width could be increased if the light intensity is very small in order to improve the signal-to-noise ratio. It is of particular advantage in this connection that the slit width can be changed quickly so that reactions even to fast variations in the light intensity are possible.

BRIEF DESCRIPTION OF THE DRAWINGS

Subsequently, embodiments of the invention are explained in detail with reference to the drawings.

FIG. 2 is a magnified view of the slit plate depicted in FIG. 1a.

DETAILED DESCRIPTION OF THE INVENTION

Figure 1A:
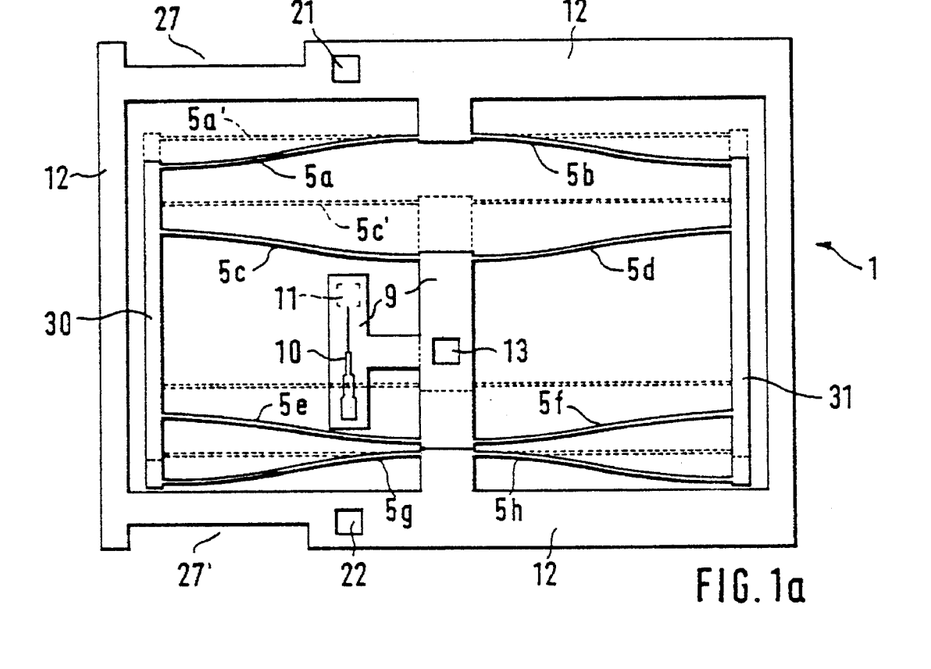
FIGS. 1a and 1b show the main parts of a slit arrangement according to a first embodiment of the invention in a disassembled state.
Figure 1B:
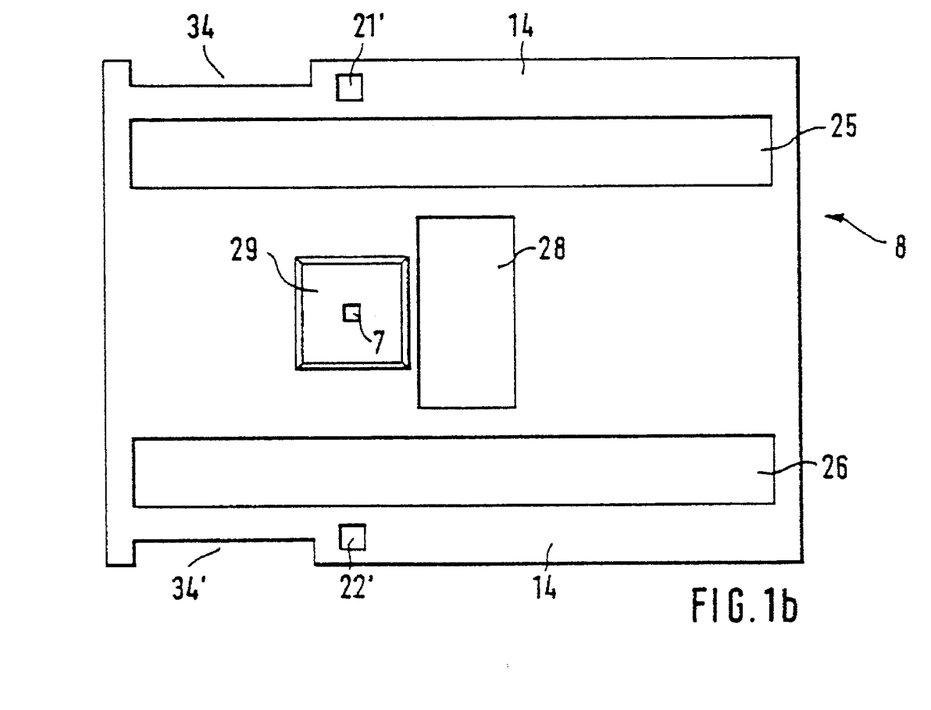

FIGS. 1a and 1b show the two main parts of a slit arrangement according to a first embodiment of the invention in a disassembled state. The two depicted parts are processed silicon chips wherein the structures shown have been produced by techniques which are similar to those used in the production of semiconductor chips used in electronic devices. In the assembled state (see FIG. 3), the first chip 1 shown in FIG. 1a is arranged below the second chip 8 shown in FIG. 1b such that the locator holes 21 and 22 of the first chip 1 are aligned with the locator holes 21' and 22', respectively, in the second chip.

The first chip 1 comprises a movable plate 9 with a step slit 10. The step slit comprises a plurality of rectangular openings of different widths, corresponding to the different slit widths which can be adjusted. The movable plate 9 will be described in more detail below with reference to FIG. 2. The plate 9 is suspended to resilient elements 5a–5h which are beams of silicon machined from the chip 1. In FIG. 1a, the plate 9 and thus the resilient beams 5a–5h are shown deflected from their position of rest. In this deflected position, the beams 5a–5h are bent. The position of rest is depicted by dotted lines, such as 5a' and 5c'. In this undeflected position, the beams are straight.

Each of the beams 5a, 5b, 5g, 5h is connected with its one end to the outer frame 12 of the first chip 1 and with its other end to movable bars 30 or 31 as shown in FIG. 1a. Each of the beams 5c, 5d, 5e, 5f is connected with its one end to the movable plate 9 and with its other end to the movable bars 30 or 31. The inner part of the chip 1 comprising the plate 9, the bars 30 and 31 and the connecting beams are thus freely movable relative to the outer frame 12. The force for moving the plate 9 is applied via the hole 13.

Figure 3:
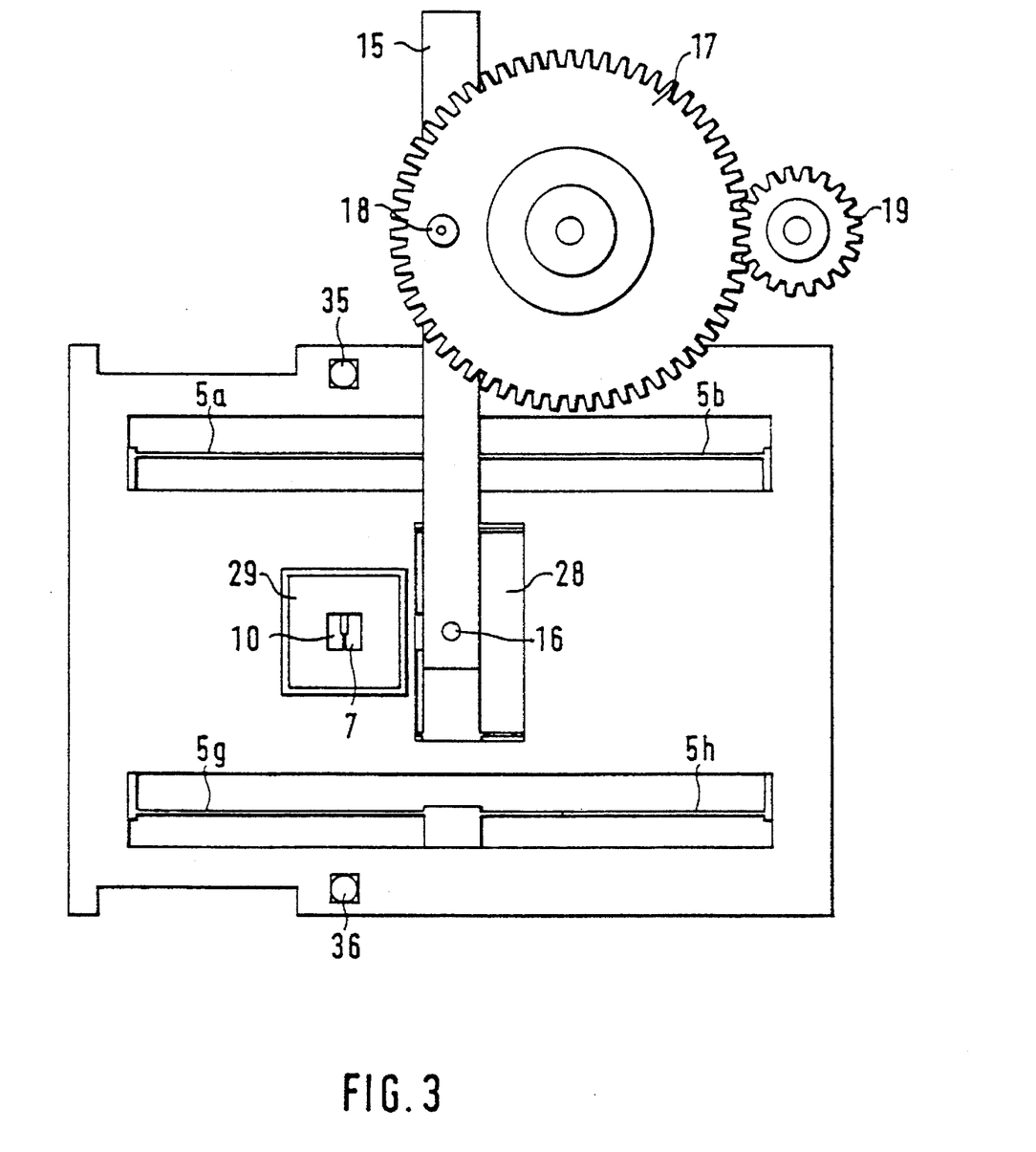
FIG. 3 shows the slit arrangement according to the first embodiment of the invention in the assembled state together with drive means for the slit plate.

The second chip 8, shown in FIG. 1b, comprises an aperture 7, which determines the height of the slit through which the light is transmitted. The aperture 7 is located at such a position that in the assembled state, i.e., when chips 1 and 8 are connected as shown in FIG. 3, the center line of the step slit 10 is arranged below the center of the aperture. The aperture 7 is surrounded by a recess 29 where the thickness of the silicon chip is reduced. The recess 29 is shown in cross section in FIG. 4. Also provided in the chip 8 are openings 25, 26 and 28. The opening 28 serves for lead-through of the drive mechanism for moving the slit plate 9 as will be explained in more detail in connection with FIG. 3. The openings 25 and 26 have the purpose to provide a higher flexibility to the chip 8 to allow, in case of temperature changes, different thermal expansions between the silicon chip and the support (for example aluminum) to which the chip is fastened. A further measure for providing increased flexibility is to provide constrictions in the frame of the chip, such as constrictions 34 and 34' in the frame 14, or constrictions 27 or 27' in the frame 12 of the first chip 1. These constrictions mainly have the purpose to ensure a symmetric expansion behavior of the chips 1 and 8 in case of temperature changes, so that the slit centers remain stable. As shown in FIGS. 1a and 1b, the constrictions are arranged asymmetrically relative to the center axis of the chips; the reason for the asymmetry is that the step slit 10 is also arranged asymmetrically relative to the chip center axis. The second chip 8 is processed from silicon material with the same techniques used in the production of the first chip 1. The first chip 1 and the second chip 2 are typically glued together. An alternative method for connecting the two chips is anodic bonding. It is understood that instead of a silicon chip 8 a different element for providing an aperture 7 could be used. For example, a small metal plate with an aperture could be used. A possible choice is electrogalvanic plated nickel.

As can be seen in FIGS. 1a and 1b, the locator holes 21 and 22 in the first chip 1 and the center line of the step slit 10 are arranged on a common line. The same applies for the locator holes 21' and 22' of the second chip 8 and the center of the aperture 7. In the assembled state, the two chips, one arranged on top of the other, are firmly fixed on a base plate (not shown) by means of pins or other suitable fixing means which engage with the holes 21, 21' and 22, 22'. Due to this construction, it is ensured that even in case of temperature changes the position of the center of the slit 10 remains fixed. When the base plate is made of a material, for example aluminum, which has a different coefficient of thermal expansion than the chip, the fixing of the chip at positions 21 and 22 ensures the geometrical stability of the slit center, whereas the remaining parts of the silicon structure may thermally expand.

Figure 2:
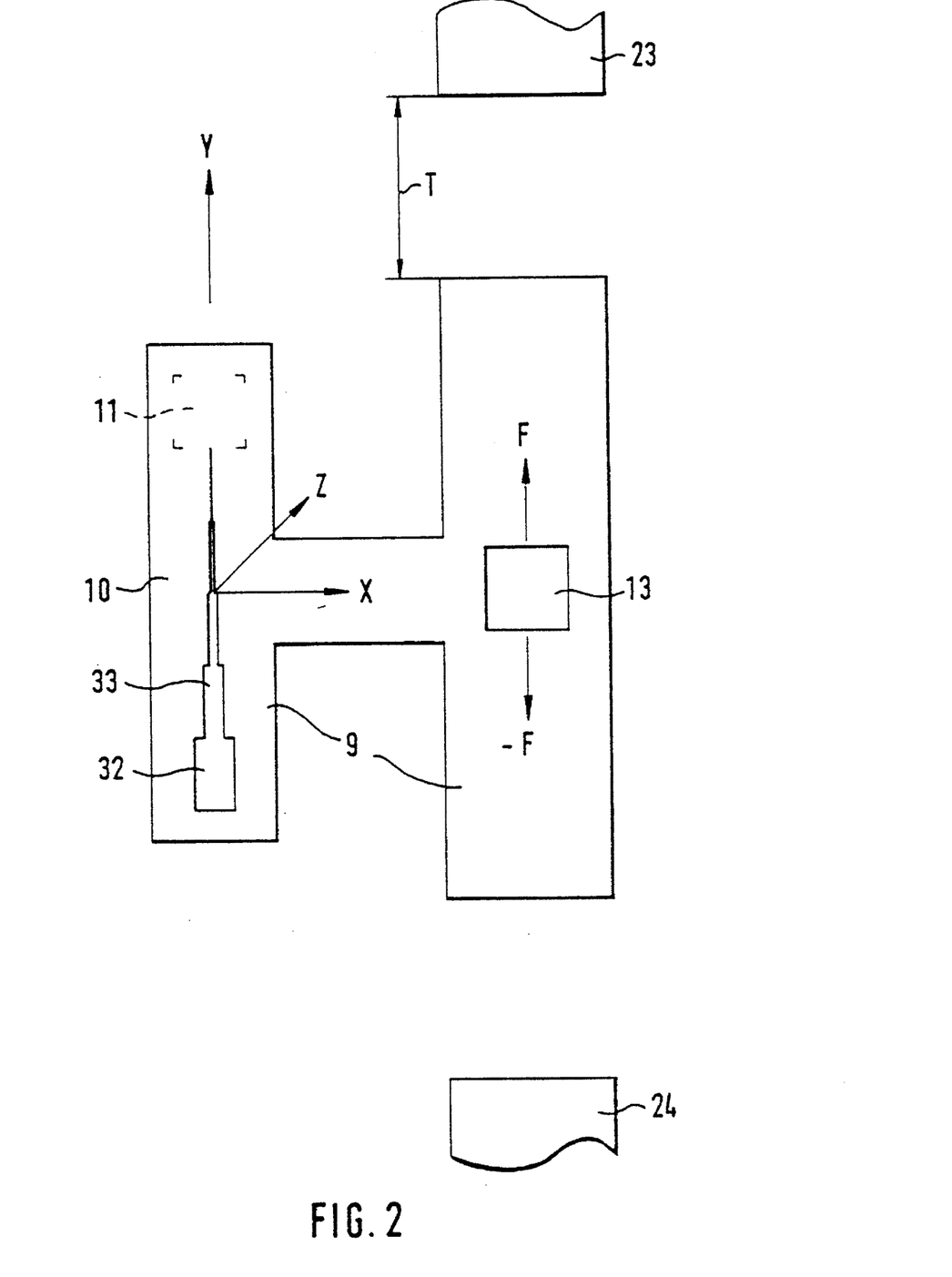

Referring to FIG. 2, the plate 9 on which the step slit 10 is arranged will be described in more detail. The plate 9 has the shape of a double T-piece, wherein the step slit is located in the smaller T-piece and the bore 13 via where a force can be applied is located in the larger T-piece. Also shown are upper and lower stops 23 and 24, respectively, which limit the movement of the plate 9. The upper and lower stops form a part of the frame 12 of a first chip 1. The step slit 10 consists of a connected series of through-holes, such as holes 32 and 33. The individual holes have a rectangular cross section and are arranged such that the centers of all holes lie on a common line. As already mentioned, this common line or center line coincides with the line connecting the locator holes 21 and 22. This common line will subsequently be referred to as Y-axis. The axis perpendicular to the Y-axis in the plane of the plate 9 will be referred to as X-axis, and the axis perpendicular to the Y-axis as well as to the X-axis, i.e., perpendicular to the plane of the paper will be denoted as Z-axis. The letter F (or –F) at the hole 13 denotes the force which can be applied at this location for moving the plate 9 upwards in the positive Y-direction or downwards in the negative Y-direction. The distance between the stops 23 or 24 and the opposing edge of the plate 9 is T, respectively, so that the total path which the plate 9 can travel in upward and downward movement is 2 times T.

Due to the mounting of the plate 9 by means of the resilient beams 5a–h as shown in FIG. 1a, the centers of the holes 32, 33, etc. move along a straight line when the plate 9 is moved. The position 11 indicated as a square of dotted lines corresponds to the shutter position. In other words: When the plate 9 has moved such that the area 11 is located below the aperture 7, the passage of light is prevented by the silicon material of the plate 9. According to a practical embodiment of the invention, the widths of the individual holes constituting the step slit 10 are 25, 50, 100, 200, and 400 micrometers. In such a practical example, the beams 5a to 5h have a length of 8 millimeters, a width of 75 micrometers and a height of 390 micrometers. In case that the differences in the widths of the holes constituting the step slit (e.g., holes 32, 33) are very large, silicon dioxide bridges across the holes are provided at the locations where the slit width changes, thus improving the stability of the structure.

In the following, the drive means for moving the plate 9 with the step slit 10 will be described in more detail with reference to FIG. 3. FIG. 3 shows the two chips 1 and 8 arranged on top of each other. A push bar 15 is connected to the plate 9 by means of a pin 16 which is pressed into the push bar and which engages with the hole 13 in the plate 9 (see FIG. 1a).

Preferably, a sleeve (not shown) having a circular opening is inserted in the hole 13 and glued to the edges of the hole 13. The pin 16 is inserted into this circular opening so that a rotatable mounting of the pin 16 to the plate 9 is achieved.

The other end of the push bar 15 is rotatably mounted to an intermediate gear 17 via a pin 18. The gear 17 engages with a second gear 19 which is mounted to the drive axis of a miniature stepping motor (not shown). Instead of a stepping motor, a magnetic drive, such as a moving coil, could be used.

The pins 35 and 36 which are arranged in the locator holes 21, 21' and 22, 22' respectively, fix the micromechanical slit assembly to the housing of a spectrometer. FIG. 3 shows the side of the slit assembly from which the light beam enters. The second chip 8 is thus facing the observer in this drawing. The light beam passes through the aperture 7 and a portion of the beam impinges on the plate 9 and the remaining portion passes through the slit which is arranged behind the aperture. The opening 28 in the second chip ensures that the pin 16 can be connected with the plate 9 of the fist chip and that it can be moved across a certain distance.

Figure 4:
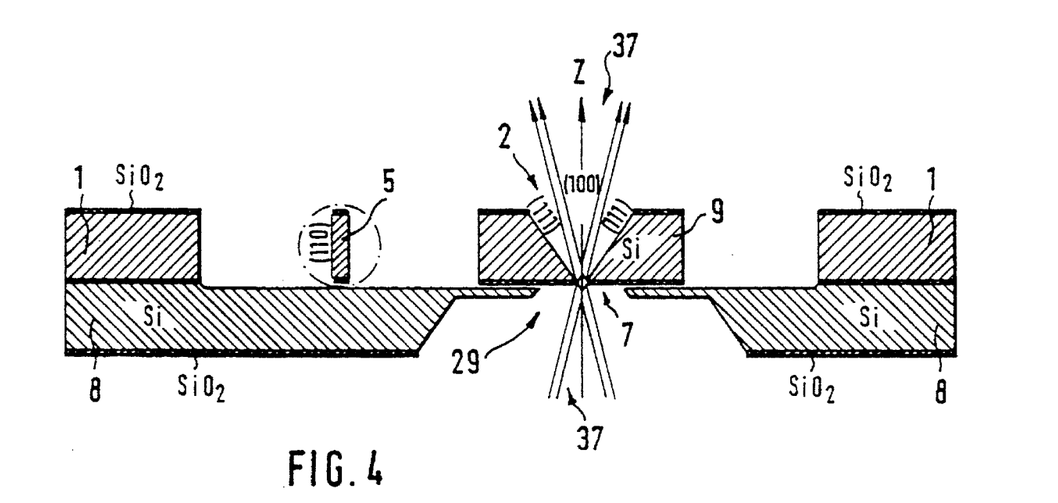
FIG. 4 is a schematic cross sectional view of a portion of the two parts shown in FIGS. 1a and 1b in the assembled state.

FIG. 4 is a schematic cross section along the X-direction through a part of the first chip 1 and the second chip 8 in the assembled state. The first chip 1 as well as the second chip 8 are made of silicon (Si), the surfaces of the chips comprise a thin layer of silicon dioxide (SiO2). A light beam 37 enters the slit assembly through the aperture 7, passes through an opening of the step slit and then travels further to subsequent components of the spectrometer. The optical axis is in Z-direction. A recess 29 is provided around the aperture 7, the edge regions of the recess are chamfered. The purpose of the recess 29 is to prevent reflections of the incoming light beam 37 at the edges of the second chip 8. The slit area 2 in the plate 9 is V-shaped so that there is sufficient free space for the cone of light exiting from the slit. The number triples in brackets indicted in FIG. 4, for example (111) or (100), denote the crystallographic planes of the silicon chip. FIG. 4 also depicts a detail shown within a circle of broken lines and having the reference numeral 5. This detail symbolizes one of the resilient beams to which the plate 9 is fastened as shown in FIG. 1a. It is to be pointed out, however, that the detail within broken lines is not shown in a section along the X-direction as the rest of the drawing, but along the Y-direction. The main purpose of this form of graphical representation is to illustrate that the resilient beams are made of the same material as the rest of the elements shown in FIG. 4 and in the same manufacturing process.

Figure 5:
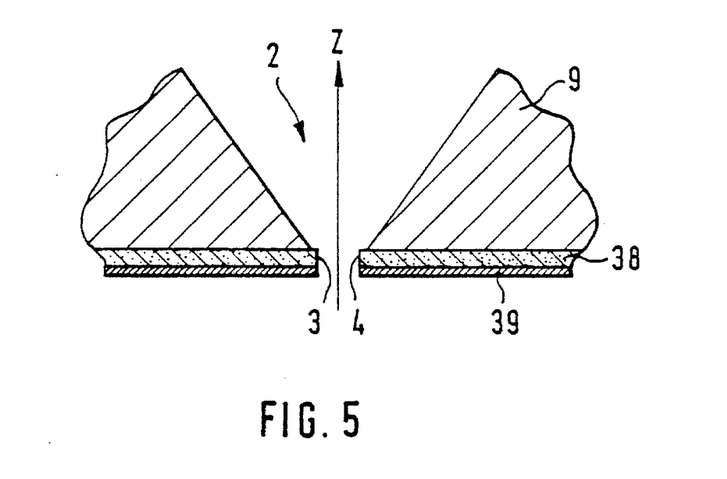
FIG. 5 is a magnified view of the slit edge shown in FIG. 4.

A magnified view of the slit area 2 is shown in FIG. 5. The slit edges 3 and 4 are formed by the ends of a silicon dioxide layer 38 and a metal layer 39 deposited on top of the silicon dioxide layer. Thus, very precise and flawless slit edges are formed which are parallel to each other and have a well-defined distance to each other. In an embodiment of the invention, the thickness of the silicon dioxide layer 38 is about 1 micrometer and the thickness of the metal layer 39 is a few tenths of a micrometer. There is a spacing between the second chip 8 and the plate 9 carrying the step slit 10 such that the plate 9 is movable across the chip 8. The same applies to the silicon beams 5a–5h and the movable bars 30 and 31. According to a practical example, the spacing between the lower edge of the metal layer 39 and the surface of the chip 8 is about 10 micrometers.

The slit adjustment procedure for adjusting a desired slit width is started in that a controller for controlling the stepping motor provides a predetermined step number to the stepping motor which is larger than the total path which the plate 9 can travel (i.e., two times T, see FIG. 2). This is performed independently of the actual position of the slit arrangement. The plate 9 is then moved against one of the two mechanical stops 23 or 24. This stop position is a well-defined position from which the desired slit position is approached by a predetermined number of steps of the stepping motor. The relationship between the step number and the deflection of the plate 9 is linear to a good approximation. In an alternative to the above mentioned adjustment procedure, the plate 9 need not be moved against the stops 23 or 24 if the actual slit position from which a new position is to be approached is known. The adjustment of a new position can then be performed relative to this actual position. In a preferred embodiment of the invention, the height of each of the individual openings (for example 32, 33 in FIG. 2) constituting the step slit 10 is greater than the height of the aperture 7 which is arranged above the step slit. In a practical example, the aperture has a height of 500 micrometers and the openings have a height of 700 micrometers. Consequently, the requirements regarding positioning accuracy in the Y-direction need not be exceptionally high.

Any mechanical tolerances or play in the gears or in the fit of parts of the slit drive are compensated by the elastic forces provided by the resilient beams 5a–5h. The currentless static torque of the miniature stepping motor is sufficiently large for holding the slit arrangement in a stable position, even at maximum deflection of the slit plate. A slit system according to the invention can be moved back and forth several million times with practically no deviation of the center of the slit from its ideal position. This is an important advantage in spectroscopic applications. In a practical embodiment of the invention, the mechanical reproducibility of the center of the step slit 10 has been found to be better than +/−10 nanometers.

In the following, some details of the process for manufacturing the slit will be described with reference to FIG. 4. Basically, the procedures used in the manufacture of the chips 1 and 8 are those used for manufacturing microelectronic or micromechanical components. Anisotropic etching of the silicon material, in connection with specific etch stops are the basis for the manufacture of the slit/beam system constituting the slit arrangement of the invention. With anisotropic etching solutions, the speed of etching is minimal in the direction of the (111) crystallographic planes. The (111) crystallographic planes thus are limiting for the etching. The various crystallographic planes in the silicon material are indicated in FIG. 4. When deep-etching (100) silicon, on which masks with properly oriented rectangular openings are provided, V-shaped holes are produced having (111) planes as lateral walls.

Figure 6:
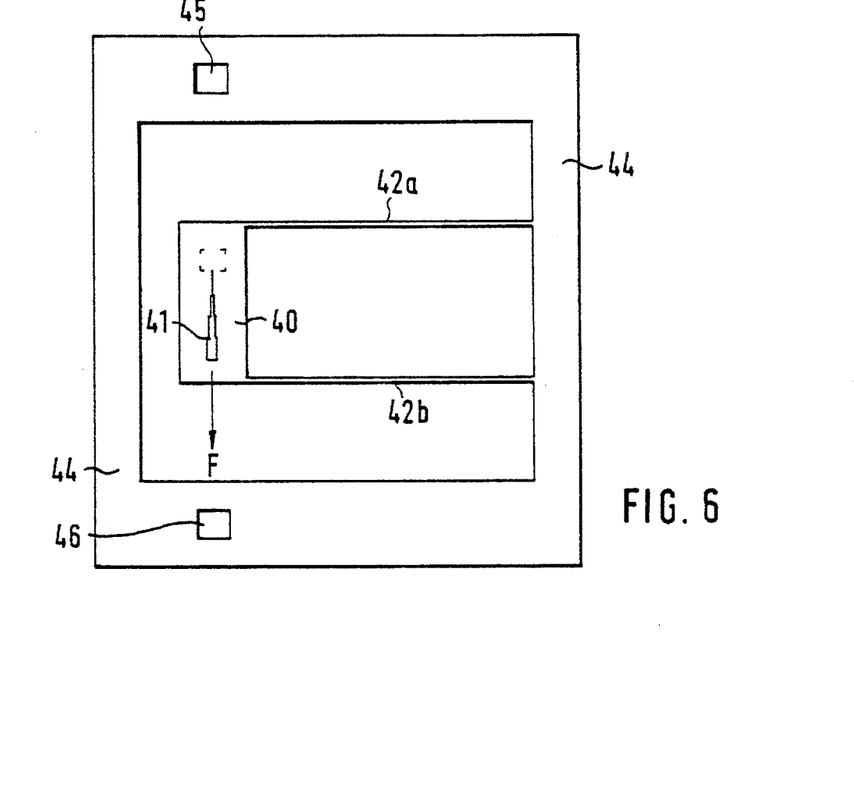
FIG. 6 shows a part of a slit arrangement according to a first alternative embodiment of the invention.

In the embodiment explained in connection with FIGS. 1 to 5, the plate 9 with the step slit 10 moves along a straight line. Such movement along a straight line can be achieved because the resilient beams 5c–5f to which the plate 9 is fastened are not directly connected to the frame 12 of the chip 1, but to the movable bars 30 and 31. In an alternative embodiment shown in FIG. 6, a plate 40 carrying a step slit 41 is fastened to a frame 44 by resilient beams 42a and 42b. Like in the previously described embodiment, the plate 40, the beams 42a, 42b and the frame 44 are machined from a single chip. There are locator holes 45 and 46 through which the frame 44 is fastened to a spectrometer. For adjusting different slit widths, the plate 40 is moved by application of a force, illustrated by the arrow F. Since the beams 42a and 42b are directly fixed to the frame 44, the centers of the various holes of the step slit 41 describe a parabola instead of a straight line when the plate 40 is moved. If it is desired that the centers of the individual holes which constitute the step slit 41 coincide when the plate 40 is moved, these holes can be arranged along a parabola which is inverse to the parabola which is described by the plate 40. Thus, the parabolic arrangement of the holes in the plate 40 compensates the parabola which the plate 40 describes during its movement, resulting in the reproducibility of the slit centers for various slit widths. The embodiment shown in FIG. 6 has the advantage that it is less complex and requires a smaller chip than the embodiment described in connection with FIGS. 1 to 5. A certain disadvantage is that it requires a higher positioning accuracy than in Y-direction and a higher force for moving the slit plate.

Figure 7:
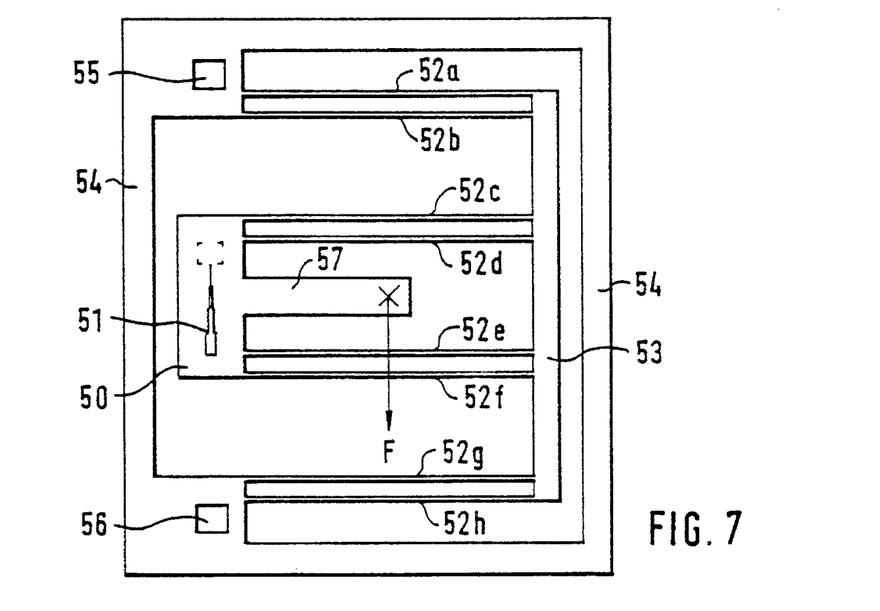
FIG. 7 shows a part of a slit arrangement according to a second alternative embodiment of the invention.

Another embodiment wherein the chip size is reduced is shown in FIG. 7. A plate 50 with the step slit 51 is suspended to a movable bar 53 by means of resilient beams 52c–52f. The movable bar 53 in turn is suspended to a frame 54 by means of resilient bars 52a, 52b and 52g, 52h. The frame comprises locator holes 55 and 56. The force F for moving the plate 50 and thus for adjusting different slit widths is applied via an extension 57 of the plate 50. The point where the force F is applied is located on a line passing through the middle of the resilient beams 52c– 52f. The centers of the holes constituting the step slit 51 describe a straight line when the plate 50 is moved. As in the previously described embodiments, all the elements shown are manufactured from a silicon chip. The use of double beams, for example beams 52a and 52b, reduces the sensitivity to transverse forces, i.e., forces acting transversely to the direction of the force F which would result in a tilting of the plate slit plate.

The processing of a silicon chip for producing the microstructures constituting the apparatus of the invention typically comprises one or more etching steps. Such etching steps, in particular the anisotropic etching of the (100) crystallographic plane in silicon, may lead to unwanted structures in convex corners of the chip. Such convex corners are typically located at the ends of the resilient beams where they are connected to the frame of the silicon chip or to the movable silicon bars. The unwanted structures may appear as peaks at the ends of the resilient silicon beams and cause an increased mechanical stress. Such increased mechanical stress may lead to material fatigue when the beams are frequently moved back and forth and finally to rupturing of the silicon structure. In order to avoid or to reduce fatigue fracture, several measures can be employed: Generally, the stress at the end of a resilient beam is proportional to the elongation of the beam. Thus, the stress can be reduced by reducing the elongation of the resilient beams, or in other words, the path which the plate carrying the step slit has to travel. One possibility to reduce this path length is to reduce the heights of the holes constituting the step slit, so that the plate does not have to be moved so far for adjusting different slit widths. This solution would have the disadvantage that the open area of the slit and therefore the light throughout would be reduced.

Figure 8:
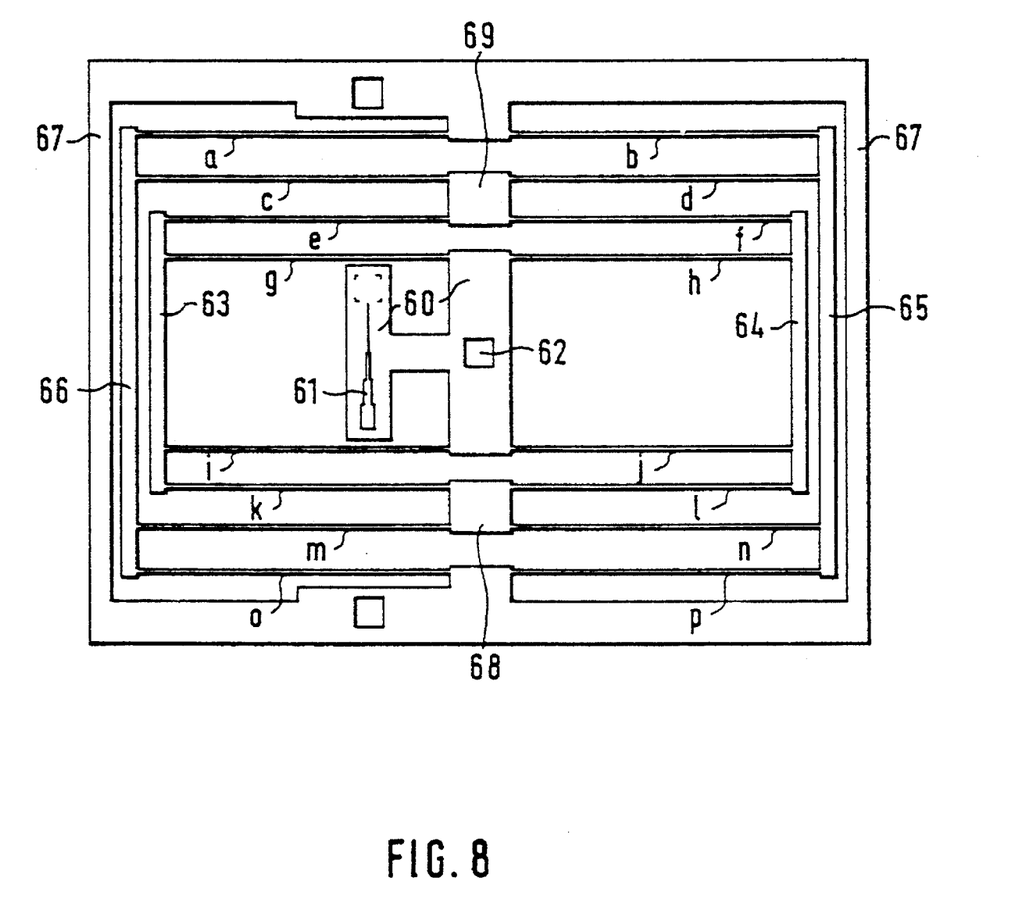
FIG. 8 shows a part of a slit arrangement according to a third alternative embodiment of the invention.

A second solution is also based on the idea to reduce the elongation of the resilient beams, but it does not have the disadvantage of the first solution. According to this second solution, a plurality of nested resilient beams and moving bars are provided such that the total path travelled by the plate carrying the step slit is distributed to a higher number of bars than, for example, in the embodiment shown in FIG. 1a. An example for this embodiment is shown in FIG. 8. The plate 60 carries a step slit 61, the force for moving the plate 60 is applied via the hole 62. The plate 60 is suspended via the resilient bars g, h, i, j to the movable bars 63 and 64. The movable bars 63 and 64 are connected to intermediate pieces 68 and 69 by resilient beams e, f, k, l. The intermediate pieces 68 and 69 are movable. The intermediate pieces 68 and 69 are connected via resilient beams c, d, m, n to the movable bars 65 and 66. The movable bars 65 and 66 are connected via resilient beams a, b, o, p to the frame 67 of the chip.

When comparing the arrangement shown in FIG. 8 with the arrangement shown in FIG. 8, it becomes apparent that the elongations of the individual resilient beams (a–p) in FIG. 8 are smaller than in FIG. 1a when the plate carrying the step slit (reference numbers 60 in FIG. 8 and 9 in FIG. 1a) is moved by the same distance, respectively. Since the deflections of the beams are smaller, there is less stress at the ends of the beams, resulting in a reduced risk of fracture of the material.

Figure 9A:
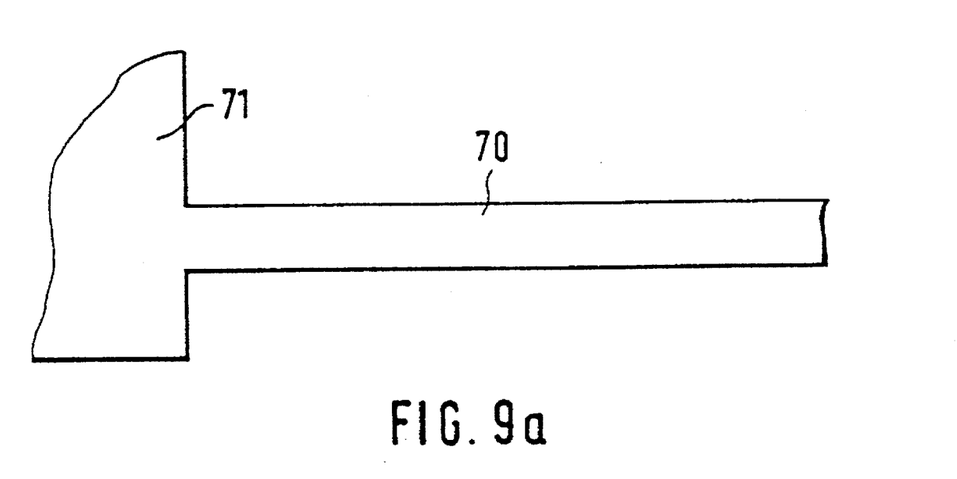
FIGS. 9a and 9b depict details of a slit arrangement of the invention, respectively, for illustrating the reduction of mechanical stress.
Figure 9B:
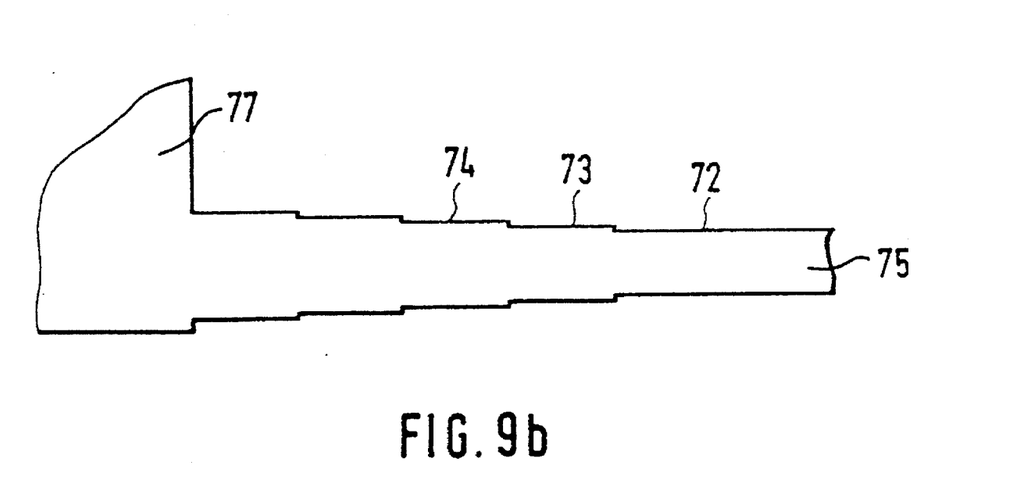

A third solution for reducing mechanical stress at the unwanted remaining structures near the ends of the resilient beams will now be explained with reference to FIGS. 9a and 9b. FIG. 9a is a detailed view of the junction area of a resilient beam 70 to a piece 71, such as a movable bar or a frame as shown in FIGS. 1a or 8. It can be seen that the beam 70 has a uniform thickness. The principle of the third solution for reducing mechanical stress is illustrated in FIG. 9b: The thickness of the beam 75 increases towards the end of the beam. As shown in FIG. 9b, the beam ends in several steps 72, 73, 74 which become larger towards the piece 77 to which it is connected. In that way, excessive bending of the beam 75 at its end is avoided. Since the critical area is at the ends of the beams due to the above mentioned unwanted structures, this solution provides a very effective way of avoiding material fracture. Resilient beams with increasing thickness according to FIG. 9b can easily be produced in the micromechanical manufacture of the chip constituting the adjustable slit system. An advantage of this solution is the reduced complexity as compared to the solution shown in FIG. 8.

Figure 10A:
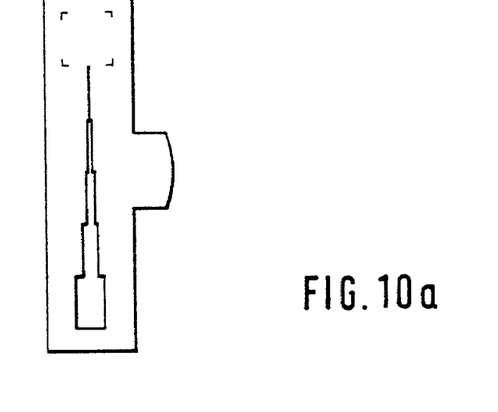
FIGS. 10a and 10b depict two embodiments of a slit plate in a slit arrangement of the invention, for illustrating an alternative solution for reduction of mechanical stress.
Figure 10B:
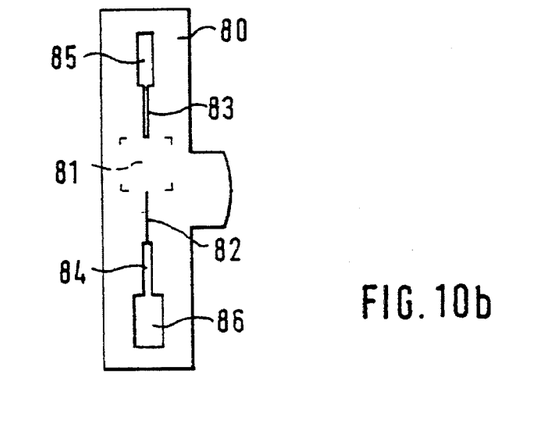

A fourth solution for reducing material fractures consists in an optimization of the sequence of the holes and/or the shutter position on the slit plate. This is illustrated in FIGS. 10a and 10b. FIG. 10a depicts a hole sequence as shown in the previously described embodiments, FIG. 10b depicts an optimized hole sequence. According to FIG. 10b,, the holes which are used more frequently than others and the shutter position 81 are arranged near the center of the movable slit plate 80. In the example shown, the slit width corresponding to the hole 82 is used most frequently, then follow the holes 83, 84, 85 and 86. Since the shutter 81 typically is used quite often, it is also arranged near the center. The consequence of this arrangement of the holes and of the shutter position is that on the average stress reversals take place at smaller curvatures of the resilient beams. Thus, the risk of fatigue fracture is reduced. It is understood that combinations of the mentioned four solutions are possible to still further reduce any remaining fracture problems.

It is understood that various modifications to the above described specific embodiments of the invention are possible. For example, the invention is not limited to an adjustable slit, but other optical functions can also be integrated in the component of the invention, such as a shutter, wavelength normal, second order filter, an absorber or a mirror.

Figure 11:
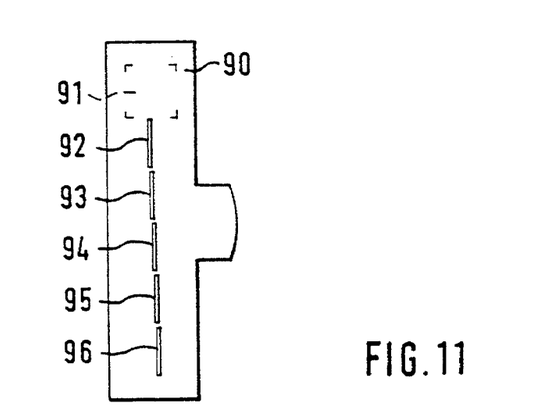
FIG. 11 shows a part of a further alternative embodiment of the invention for improving spectral resolution in a photodiode array spectrometer.

A further optical function which can be performed with an adjustable component of the invention will now be described with reference to FIG. 11. In accordance with this embodiment, the spectral resolution of a photodiode array spectrometer can be improved. The technical principle for resolution improvement consists in a stepwise shifting of the spectral information impinging on the photodiode array along the array. This 10 principle has been developed from the resolution improvement method disclosed in EP-A- 0 320 530. FIG. 11 shows a slit plate 90 in accordance with the present invention comprising several openings 92–96 and a shutter position 91. The elements for suspending the slit plate 90 and for moving it substantially correspond to those disclosed in the above described embodiments of the invention. Subsequently, the method of the present invention for improving resolution will be explained, starting from some general considerations on photodiode array spectrometers.

The distance d between two diodes in a photodiode array is constant. When the spectrometer slit is moved in X-direction out of its center position, the spectral information is moved relative to the diode array. When the slit is moved by a distance d in X-direction, the spectrum will also move by a distance d so that the same spectral information is obtained on the photodiode array as before the movement, but it is shifted by one diode. When the slit center position is shifted in predetermined steps, whereby each of the steps is smaller than d, the resolution can be improved as explained in EP-A-0 320 530. In accordance with an embodiment of the invention, the stepwise movement of the slit center is achieved by providing an arrangement of slit openings as shown in FIG. 11, wherein the openings have an offset in X-direction relative to each other corresponding to the desired step width, and by stepwise movement of the slit arrangement in Y-direction. Example: The distance between two diodes is 25 micrometers.

It is assumed that the spectrum is to be shifted in steps of 5 micrometers. Thus, five slit openings 92-96 are required, having a distance between their center positions of 5 micrometers. By the way, a sixth slit opening would not provide any additional gain in spectral information. Spectra obtained with the slit openings 92-96, respectively, are successively recorded. With the opening 92, a spectrum at relative position 0 micrometers is recorded, with the opening 93, a spectrum at relative position 5 micrometers is recorded, etc. Thereafter, the recorded spectra are processed to derive a spectrum with improved resolution.

We claim:

1. An adjustable optical component comprising:
   a) a movable member for providing an optical function, said movable member having a portion which exhibits a planar shape and comprised of a base material which enables said movable member to exhibit rigidity in a direction normal to said planar shape,
   b) resilient suspension means, for connecting the movable member to a frame, wherein
   c) the movable member and the resilient suspension means mainly consist of microstructures made of a common base material.

2. Optical component as in claim 1, wherein the essential parts of the movable member, of the resilient suspension means, and of the frame are manufactured from a single chip by a microstructure technique, for example by a micromechanical technique comprising anisotropic etching.

3. Optical component as in claim 1, wherein the movable member comprises:
   a plurality of openings of different widths for providing a slit of adjustable width, and
   an opaque portion for providing an optical shutter.

4. Optical component as in claim 3, wherein the plurality of openings are arranged on the movable member such that the centers of the openings lie on a common line (Y-axis) and wherein the movable member is movable along a lone which is parallel to this common line.

5. Optical component as in claim 4, comprising mounting means for fixing the frame to a support, said mounting means being arranged substantially along the line (Y-axis) of the centers of the openings.

6. Optical component as in claim 3 further comprising:
   an aperture plate with an aperture located over the movable member.

7. Optical component as in claim 1, wherein the resilient suspension means comprise at least two substantially parallel resilient beams.

8. Optical component as in claim 7, wherein the resilient suspension means further comprises at least two movable bars which are connected via resilient beams to the frame and via additional resilient beams to the movable member.

9. Optical component as in claim 7, wherein the cross section of the resilient beams increases towards the ends of the beams, thus avoiding excessive bending of the beams at their ends.

10. Optical component as in claim 1, comprising mechanical stops for limiting the movement of the movable member.

11. Optical component as in claim 1, wherein drive means for the controlled movement of the movable member are provided, said drive means comprising a push bar connected to the movable member, a gear arrangement connected to the push bar, and a motor connected to the gear arrangement.

12. Optical component as in claim 1, wherein the movable member comprises a plurality of optical interaction regions each of which provides a different optical function, respectively, when arranged in an incoming light beam.

13. A spectrophotometer including an optical component as recited in claim 1.

* * * * *